United States Patent
Weatherhead

(10) Patent No.: US 7,966,523 B2
(45) Date of Patent: Jun. 21, 2011

(54) INDUSTRIAL AUTOMATION AND INFORMATION SOLUTIONS HAVING INDUSTRY SPECIFIC MODALITIES

(75) Inventor: N. Andrew Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 278 days.

(21) Appl. No.: 12/196,105

(22) Filed: Aug. 21, 2008

(65) Prior Publication Data
US 2010/0050020 A1 Feb. 25, 2010

(51) Int. Cl.
*G06F 11/00* (2006.01)

(52) U.S. Cl. ............................... 714/33; 714/37
(58) Field of Classification Search ........... 714/33
See application file for complete search history.

(56) References Cited

U.S. PATENT DOCUMENTS

| | | |
|---|---|---|
| 4,536,840 A | 8/1985 | Borta |
| 4,831,580 A | 5/1989 | Yamada |
| 5,797,015 A * | 8/1998 | Daniels et al. ............ 717/163 |
| 5,920,718 A | 7/1999 | Uczekaj et al. |
| 5,966,532 A | 10/1999 | McDonald et al. |
| 6,053,951 A | 4/2000 | McDonald et al. |
| 6,117,187 A | 9/2000 | Staelin |
| 6,163,878 A | 12/2000 | Kohl |
| 6,170,081 B1 | 1/2001 | Fontana et al. |
| 6,230,318 B1 | 5/2001 | Halstead et al. |
| 6,243,857 B1 | 6/2001 | Logan, III et al. |
| 6,476,828 B1 | 11/2002 | Burkett et al. |
| 6,530,054 B2 * | 3/2003 | Hollander ................ 714/739 |
| 6,564,368 B1 | 5/2003 | Beckett et al. |
| 6,564,375 B1 | 5/2003 | Jiang |
| 6,574,791 B1 | 6/2003 | Gauthier et al. |
| 6,615,198 B1 | 9/2003 | Aldrich |
| 6,871,340 B1 | 3/2005 | Gillis |
| 6,922,684 B1 * | 7/2005 | Aldridge et al. ............. 706/60 |
| 6,957,418 B2 | 10/2005 | Batcha et al. |
| 7,159,183 B1 | 1/2007 | Kudukoli et al. |
| 7,210,117 B2 | 4/2007 | Kudukoli et al. |
| 7,243,334 B1 | 7/2007 | Berger et al. |
| 7,340,684 B2 | 3/2008 | Ramamoorthy et al. |
| 7,356,773 B1 | 4/2008 | Barraclough |
| 7,613,599 B2 * | 11/2009 | Bade et al. ................ 703/14 |
| 7,729,891 B2 * | 6/2010 | Fine et al. ................ 703/2 |
| 2004/0177002 A1 * | 9/2004 | Abelow ................ 705/14 |
| 2005/0273395 A1 * | 12/2005 | Andersson et al. ......... 705/26 |
| 2005/0278576 A1 * | 12/2005 | Hekmatpour ............. 714/37 |
| 2006/0236286 A1 * | 10/2006 | Tseng ................ 716/11 |
| 2009/0327991 A1 * | 12/2009 | Weatherhead ............ 717/101 |
| 2010/0070345 A1 * | 3/2010 | Abelow ................ 705/10 |

* cited by examiner

*Primary Examiner* — Christopher S McCarthy
(74) *Attorney, Agent, or Firm* — Turocy & Watson LLP; Alexander R. Kuszewski; John M. Miller

(57) ABSTRACT

The innovation relates to a system and/or methodology for the configuration and creation of industrial automation designs. The system providing for the generation of functional specifications, software and hardware designs, as well as testing and testing schemas. Additionally, the innovation provides a user interface for modification of the designs and specifications.

40 Claims, 11 Drawing Sheets

INDUSTRIAL AUTOMATION AND INFORMATION SOLUTIONS HAVING INDUSTRY SPECIFIC MODALITIES

TECHNICAL FIELD

The subject innovation relates generally to industrial automation design, and more particularly to the configuration and creation of industrial automation designs having industry specific modalities.

BACKGROUND

Industrial Automation has revolutionized manufacturing in a rapidly expanding range of applications. As engineers strive to create systems of ever increasing complexity, the development of new and innovative information solutions has become more essential. Increases in computer networking capability, processing power, and storage capacity have made faster, smarter and more reliable automation systems possible. However, the efficiency at which the systems can be designed, programmed, and installed has largely lagged behind the pace at which the automation systems themselves are improving.

Currently, industrial automation designers, programmers, and engineers are often required to reengineer identical or similar components repeatedly for different projects. In addition, frequently a high degree of redundancy exists between the designs of components for unrelated projects. This redundancy can be caused by industry specific, customer specific, and/or application specific requirements.

The continual reinventing and reengineering of identical or similar components is highly inefficient. Moreover, due to the high degree of redundancy the constant rehashing of similar subject matter is wholly unnecessary. Consequently, a substantial need exists for an industrial automation information solution that reduces the necessity for reengineering and increases efficiency.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The claimed subject matter relates to a system and/or method for configuration and creation of industrial automation designs having industry specific modalities. In accordance with various aspects of the claimed subject matter, a requirements component receives or accesses one or more user requirements. The user requirements typically include general information regarding the objectives of an individual project or group of projects. The requirements component can generate one or more functional specifications based on the user requirements.

A software component can generate one or more software design specifications based on the functional specifications. The software design specifications are high-level representations illustrative of a sequence of events, and handling of exceptions, that can be translated into computer executable commands to implement the functional specifications. Additionally, the software component can translate the software design specification into computer code using one or more templates stored in a library, and can test the functionality of the computer code.

A hardware component can generate one or more hardware design specifications based on the functional specification and/or software design specification. The hardware design specifications are high-level representations of one or more hardware modules, and configurations of the modules designed to execute the objectives of the functional specification and the software design specifications. Furthermore, the hardware component can generate a bill of materials and installation specifications based on the hardware design specification.

A qualification component can perform testing and validation of the software and/or hardware modules, and may contain simulation and process emulation parameters of varying fidelity for system testing. The qualification component can test software and/or hardware modules prior to installation (e.g. pre-test or factory acceptance testing), after installation (e.g. site acceptance testing), and can validate the test results and ensure cohesive operation with the functional specifications. Moreover, the qualification component can produce one or more testing specifications, wherein the testing specifications detail a testing schema.

A resource component can contain the asset specifications, for personnel, equipment, and so forth. Moreover, the resource component can produce detailed project costs, manufacturing costs, and so forth.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
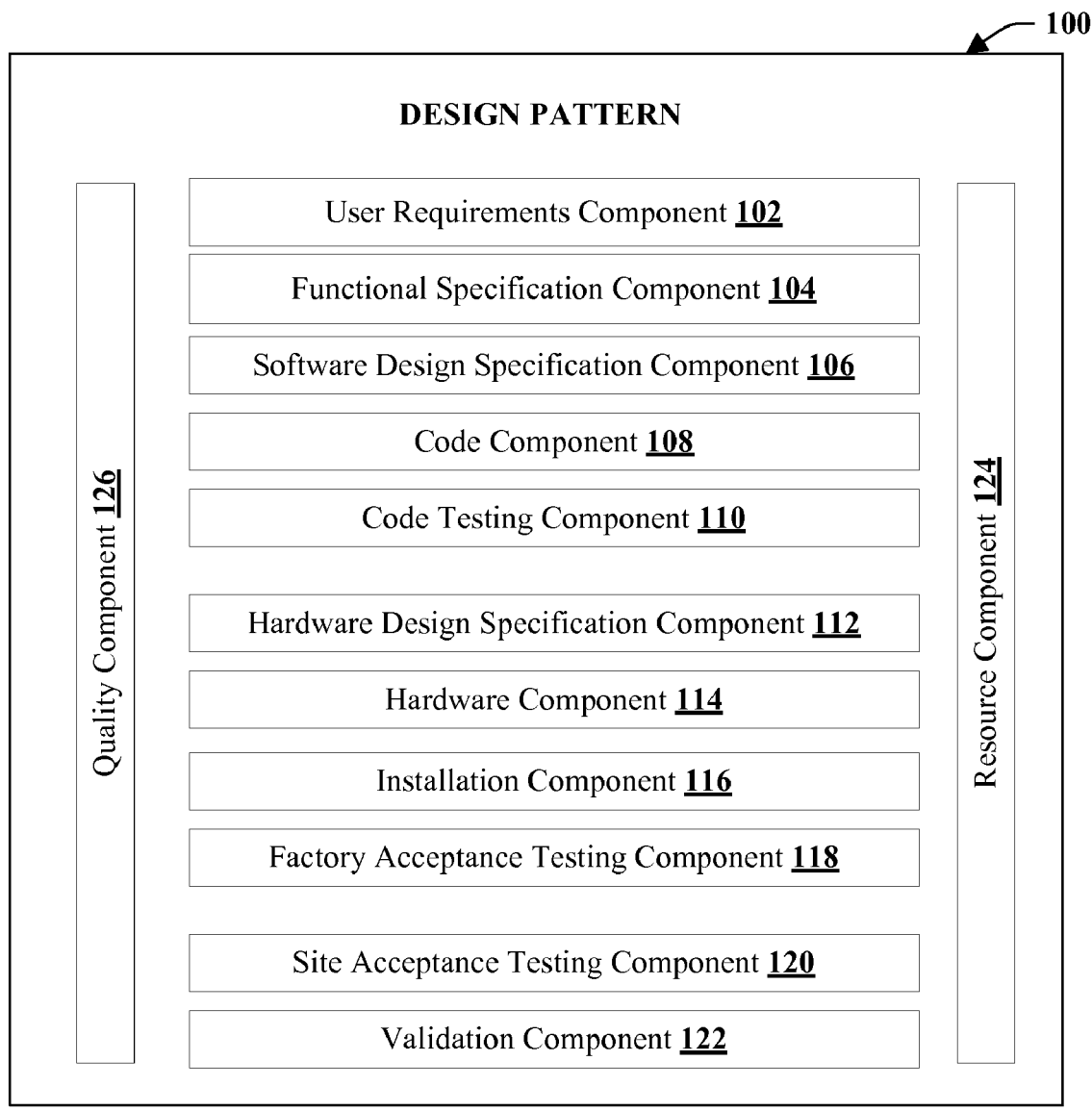
FIG. 1 is an exemplary illustration of a design pattern in accordance with an aspect of the present specification.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal)

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, an exemplary illustration of a design pattern 100 is shown in accordance with an aspect of the present innovation. The design pattern 100 is an abstracted collection of sub-components containing generic design elements. The sub-components can include but are not limited to a user requirements component 102, a functional specification component 104, a software design specification component 106, a code component 108, a code testing component 110, a hardware design specification component 112, a hardware component 114, an installation component 116, a factory acceptance and testing component 118, a site acceptance and testing component 120, and a validation component 122, a resource component 124, and a quality component 126. It is to be appreciated that the terms design pattern and design template are used interchangeably herein.

The user requirements component 102 obtains one or more user requirements. The user requirements can be obtained from a set of inputs, including explicit user inputs (e.g., configuration selections, question/answer) such as from mouse selections, keyboard selections, speech, scanner and so forth. Additionally or alternatively, the user requirements can be obtained via data transfer from a user computer, a third party computer, an associated computer, a data store, etc. Typically, the user requirements include general information regarding the objectives and goals of the user's project or group of projects. For example, the user requirements can state that the goal of a particular project is to manufacture widgets. Additionally, the user requirements can include quality specifications such as the rate at which the widgets need to be manufactured, the size of the widgets, quality tolerances, etc.

The functional specification component 104 generates one or more functional specifications based on the user requirements, wherein a functional specification is a generic list of equipment required to achieve the described functionality. For example, the functional specification component 104 can determine the engineering processes necessary to make the specified number of widgets, at the specified rate, within said quality tolerances. The functional specifications can include the equipment to be used, the sequence of operations, process inputs and outputs, process parameters, process data, operator interaction, and so forth.

The software design specification component 106 generates one or more software design specifications based on the functional specifications, wherein the software design specifications relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The code component 108 generates pre-built modules of software designed for the abstract which accept the entity relationship defined by the software design specification component 106. The high-level representations contained in the software design specifications are mapped to functions and/or computer executable commands. For example, the software design specification may require a motor to be run at a speed X. The code component 108 can generate the software code necessary to run the motor at speed X. Additionally or alternatively, the code component 108 can generate the code based at least in part on one or more design patterns. For example, if the functional specification requires a type 1 motor to be run at speed X, then the code component 108 can obtain a template regarding running a type 1 motor, and modify the design pattern to operate the motor at speed X.

The code testing component 110 tests the software code generated by the code component 108. The code testing component 110 can test the code to ensure it provides each function outlined in the functional specification(s). The code testing component may not need to test every instance of code, because a given project may require multiple instances of the same code. For instance, a functional specification may require a series of flow meters to perform an operation. The software design specification component 106 and code component 108 can handle each instance of a flow meter in a similar manner, resulting in multiple instances of similar or identical software code. Consequently, the code testing component 110 may only be required to check a single instance of a flow meter to ensure that all related flow meter codes are functioning correctly. Moreover, the code testing component 110 can produce one or more testing specifications. The testing specifications detail a testing schema, and are based at least in part on the functional specifications, and software design specifications. Additionally, for each test performed the code testing component 110 can subsequently generate one or more testing reports that detail the results of the tests. The testing reports including but not limited to errors, warnings, accuracy, possible solutions, expected results, actual results, etc.

The hardware design specification component 112 generates one or more hardware design specifications based on the functional specifications and/or software design specifications. The hardware design specifications are high-level representations of one or more hardware modules, and configurations of the modules, designed to execute the objectives of the functional specification and/or the software design specifications. For example, if the functional specifications and software design specifications require a flow meter, the hardware design specification component 112 can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, the hardware design specification component 112 can add one or more additional specification requirement layers, including but not limited to customer specific requirements, industry specific requirements, application specific requirements, and/or project specific requirements. For example, if the project is for an industry that requires explosion proof materials, then the design specification component 112 can add a corresponding industry specific requirements layer to the hardware design specifications. Similarly, if a customer has specific requirements, then an appropriate customer requirements layer can be added to the hardware design specification.

The hardware component 114 can generate a comprehensive list of the hardware required for the project based on the hardware design specifications. The list can be a bill of materials (B.O.M.), wherein the B.O.M. can include but is not limited to part names, quantities, part numbers, manufacturers, etc.

The installation component 116 can generate one or more installation specifications based on the hardware design specifications and the B.O.M. The installation specifications detail specifications of materials necessary to install the hardware modules, including but not limited to runs of wire, termination boxes, wiring specifications, conduit specifications, piping, definitions, etc.

The factory acceptance testing component 118 can qualify a design build prior to installation, including any prebuilt software or hardware modules. For example, the factory acceptance testing component 118 can test the I/O, communications, controls, and so forth of prebuilt software modules and control panels. In addition, the site acceptance testing component 120 can test software or hardware modules during or after the installation. For example, the site acceptance testing component 120 can test the I/O, communications, controls, and so forth once installation of the project is complete.

The validation component 122 validates test results from the factory acceptance testing component 118 and site acceptance testing component 120. Additionally, the validation component 122 can ensure that each element of the software design and hardware design specifications operate as intended. For example, the validation component may be particularly useful for life sciences based projects, where simply testing the design is insufficient, and validation of the test results is required.

The resource component 124 determines a cost amount (e.g. money, time, etc.) for a given project or set of projects. The resource component 124 can represent the cost amount as a maximum value, a minimum value, a target value (e.g. set point), a percentage value, a distribution, a state value (e.g. low, medium, or high), etc. The resource component 124 can determine the cost amount based on the user requirements and/or functional specification. Additionally or alternatively, the resource component 124 can infer the cost amount. The cost amount can be used by both the one or more other components in order to generate the engineering specifications. For example, the resource component 124 can determine that the maximum amount for a project is $10,000. The software design specification component 106, the hardware design specification component 112, and the hardware component 114 will maintain an aggregate cost of less than or equal to the maximum amount of $10,000.

The quality component 126 determines a quality metric based at least in part on the user requirements. The quality metric can be a real number, a target, a percentage, a distribution, a state (e.g. low, medium, or high), etc. The quality metric can be determined based on the user requirements and/or functional specifications, and can be one or more additional sub-components. For example, the quality component 126 can determine that the quality metric should be "high." Subsequently, the other sub-components will adapt their designs to accommodate the quality metric by using only modules, parts, etc. designated as "high" quality. It is appreciated that the quality component 126 and resource component 124 can be related, because typically there is a correlation between resources and quality. For example, as the cost of the modules increases presumably the quality does as well, and vice versa. Therefore, it may be desirable to integrate the resource component 124 and quality component 126.

Figure 2:
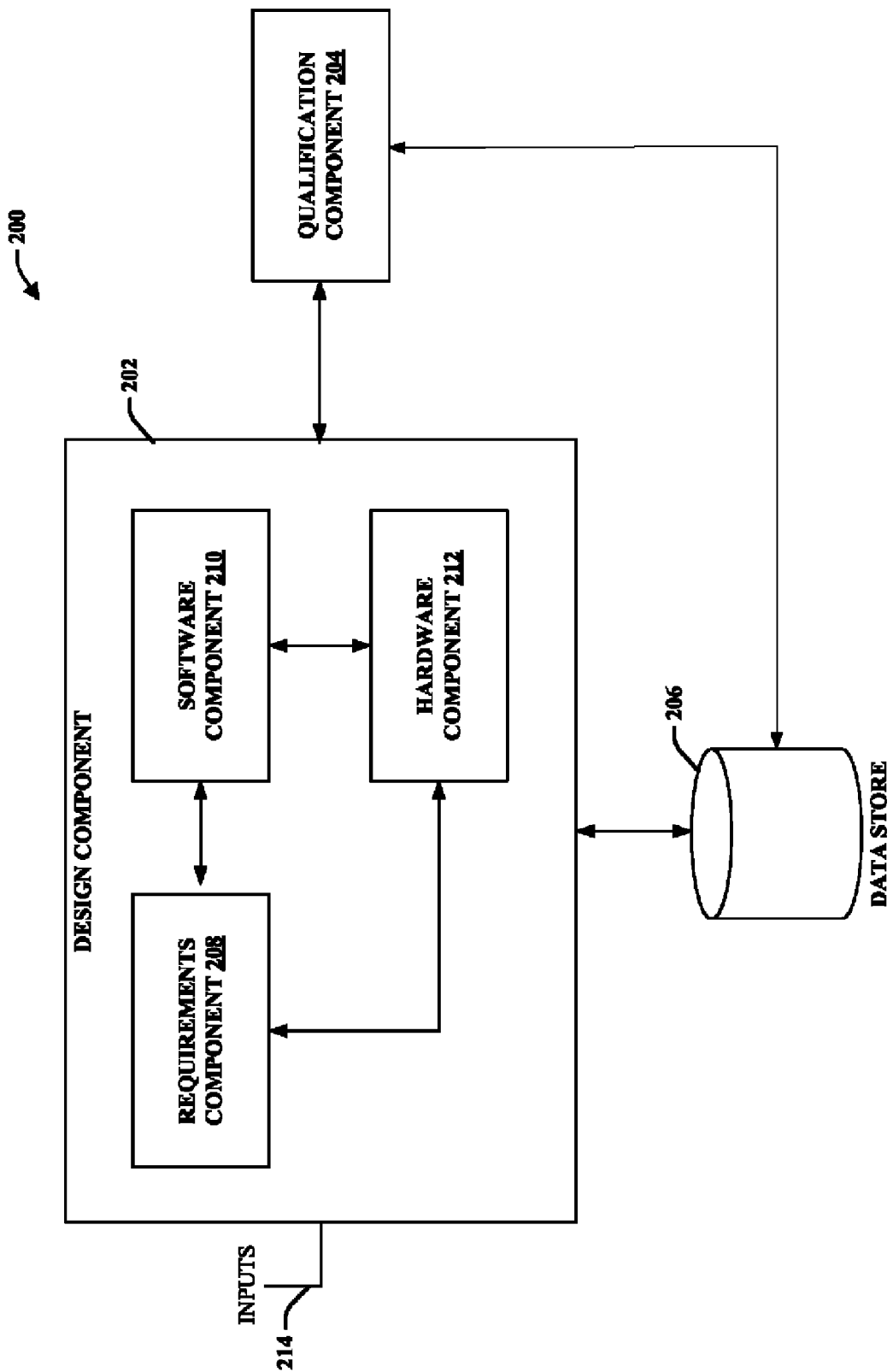
FIG. 2 is a general component block diagram illustrating a system for configuration and creation of industrial automation designs in accordance with an aspect of the present specification.

Referring to FIG. 2, an industrial automation design system 200 is illustrated in accordance with an aspect of the subject innovation. The system 200 includes a design component 202, a qualification component 204, and a data store 206. The design component 202 having a requirements component 208, a software component 210, and a hardware component 212. The requirements component 208 obtains a set of project requirements (e.g. user requirements). The project requirements can be collected can be obtained via various means. For instance, the project requirements can be acquired via user inputs 214, data transfers (from end users, third parties, associated applications, vendors, manufacturers, etc.), and so forth. The inputs 214 can include explicit user inputs (e.g., configuration selections, question/answer) such as from mouse selections, keyboard selections, speech, and so forth. Additionally or alternatively, the project requirements can be obtained from the data store 206, obtained by querying a database, or transmitted via network communications. Typically, the project requirements include general information regarding the objectives of an individual project or group of projects. For example, the user may include performance data or industry specific requirements such as safety (e.g. SIL 2), regulatory compliance (e.g. G×P), environmental compliance (e.g. Effluent Treatment specifications), and so forth.

The requirements component 208 can generate one or more functional specifications based on the project requirements. For example, based at least in part on the project requirements the requirements component 208 can determine the steps required to make the specified number of widgets, at the specified rate, within said quality tolerances. The functional specifications can include the equipment to be used, the sequence of operations, process inputs and outputs, process parameters, process data, operator interaction, sustainability requirements, and so forth.

The requirements component 208 communicates the functional specifications to the software component 210. The software component 210 can translate the functional specifications into computer executable commands. For example, a functional specification may include a certain control sequence for a collection of motors on a conveyor. The software component 210 can generate the computer code necessary to group the collection of motors by providing the appropriate interface logic to the subordinate software modules which encapsulate motor device functionality. Additionally, the software component 210 can generate the computer code based at least in part on templates stored in the data store 206. For example, the software component 210 can be provided as part of a template included in a functional specification, which includes the computer code necessary to group the collection of motors by providing the appropriate interface logic to the subordinate software modules which encapsulate motor device functionality. Additionally, the software component 210 can test the function of the computer code, and ensure that the functionality of the computer code is properly aligned with the functional specifications.

The requirements component 208 can also communicate the functional specifications to the hardware component 212. The hardware component 212 links the abstract software component 210 to the particular hardware associated with intended equipment. The hardware component 212 can generate a hardware design based on the functional specifications. Generating the hardware design can include determining inputs and outputs (I/O), selecting networks, producing drawings, and generating a bill of materials. Additionally, the hardware component 212 can integrate customer, application, project, and/or industry standard specifications into the hardware design. Moreover, the hardware component 212 can generate an installation specification based on the hardware design. For example, the hardware component 212 can determine the runs of wire and the number of termination boxes necessary for installation of the proposed hardware design.

The qualification component 204 performs testing and validation for the system 200, and can communicate with the design component 202 including the requirements component 208, software component 210, and hardware component 212. The qualification component 204 can test software and/or hardware modules prior to installation (e.g. pre-test or factory acceptance testing), after installation (e.g. site acceptance testing), and can validate the test results and ensure cohesive operation with the functional specifications. In addition the qualification component 204 may obtain pre-tested/pre-validated results associated with the requirements component 208, software component 210, and/or hardware component 212 from the data store 206.

Moreover, the qualification component 204 can produce one or more testing specifications, including but not limited to factory acceptance testing specifications, site acceptance testing specifications, and validation specifications. The testing specifications can be based at least in part on the functional specifications, software design specifications, and hardware design specifications. The factory acceptance testing specifications detail a testing schema for pretesting one or more prebuilt software and/or hardware modules. Additionally, the site acceptance testing specifications detail a testing schema for testing software and hardware modules after installation. Furthermore, the validation specifications detail a validation schema for validating test results against requirements and calibrating modules. Furthermore, for each test performed the qualification component 204 can subsequently generate one or more testing reports that detail the outcome of the tests. The testing reports including but are not limited to errors, warnings, accuracy, possible solutions, corrective actions taken, expected results, actual results, tester's signatures and qualifications, etc.

Figure 3:
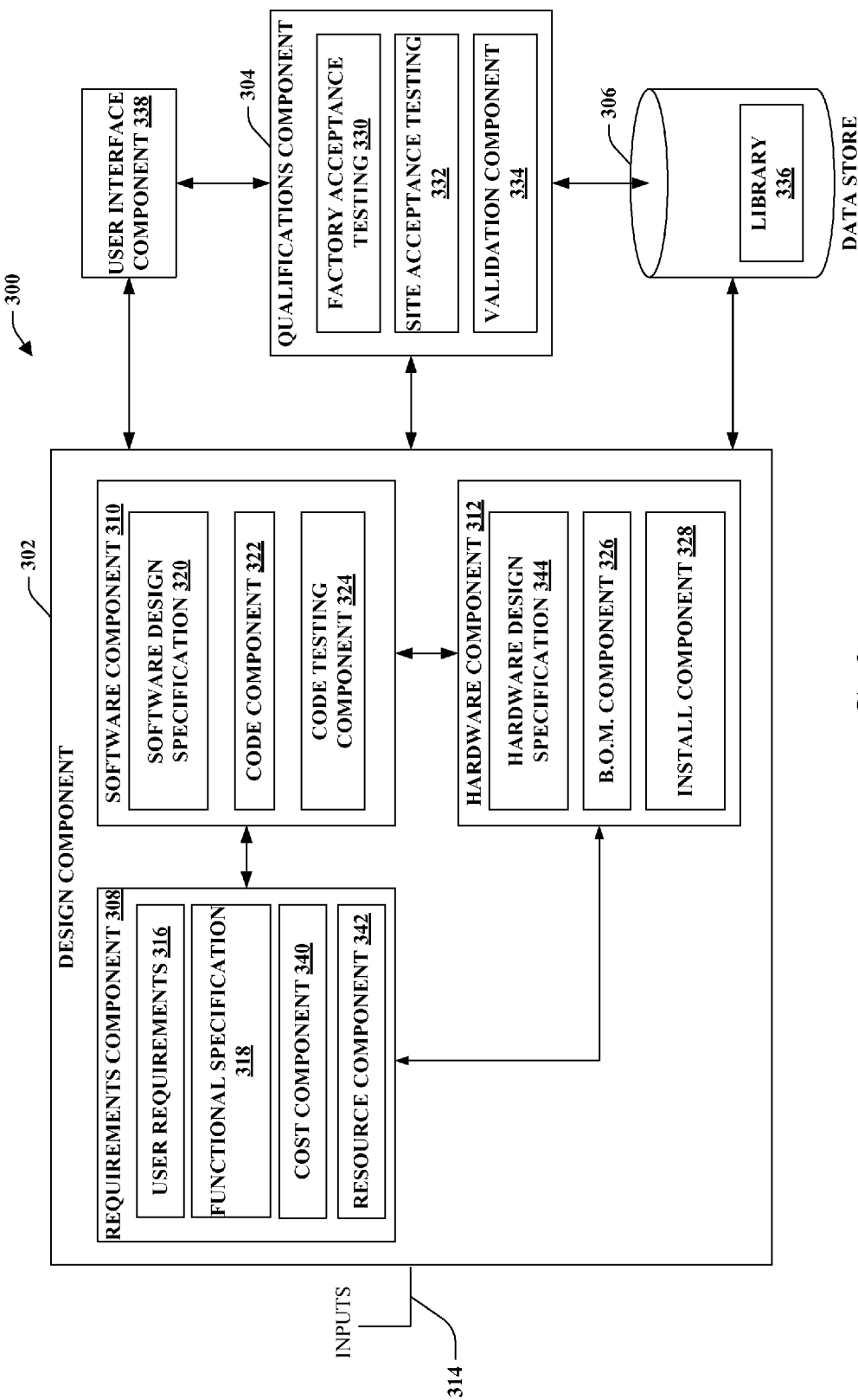
FIG. 3 is a general component block diagram illustrating a system for configuration and creation of industrial automation designs in accordance with an aspect of the present specification.

Referring now to FIG. 3, an industrial automation design system 300 is illustrated in accordance with an aspect of the subject innovation. The system 300 includes a design component 302, a qualification component 304, and a data store 306. The design component 302 includes a requirements component 308, a software component 310, and a hardware component 312. The requirements component 308 having a user requirement component 316 and a functional specification component 318. The user requirements component 316 receives a set of user requirements (e.g. project requirements). The user requirements can be received from various inputs 314. The inputs 314 including explicit user inputs (e.g., configuration selections, question/answer) such as from mouse selections, keyboard selections, speech, scanner and so forth. Additionally or alternatively, the user requirements can be retrieved from the data store 306, received by querying a database, or transmitted to the user requirements component 316 via network communications. Typically, the user requirements include general information regarding the objectives and goals of a user's project or group of projects. For example, the user requirements can state that the goal of a particular project is to manufacture widgets at a specific rate within a specified tolerance. Additionally, the project requirements can include quality goals which include the validation requirements for the project.

The user requirements component 316 communicates the user requirements to the functional specification component 318. The functional specification component 318 can generate one or more functional specifications based on the user requirements. For example, the functional specification component 318 can determine the steps necessary to make the specified number of widgets, at the specified rate, within said quality tolerances. The functional specifications can include the equipment to be used, the sequence of operations, process inputs and outputs, process parameters, process data, operator interaction, and so forth.

The software component 310 includes a software design specification component 320, a code component 322, and a code testing component 324. The software component 310 can receive the functional specifications generated by the requirements component 308. The software design specification component 320 generates one or more software design specifications based on the functional specifications. The software design specifications are high-level (e.g. generic)

representations illustrative of a sequence of events, and handling of exceptions, that can be translated into computer executable commands to implement the functional specifications. The software design specifications can be illustrated via block diagrams, flow charts, drawings (e.g. S88 batch-control-process-requirements).

The software design specification component 320 communicates the software design specifications to the code component 322. The code component 322 determines computer code based on the software design specifications, wherein the high-level representations are converted into computer executable commands. For example, the software design specification may require a certain set of interlocks for motor X. The code component 322 can generate the software code necessary to provide the required interlocks to motor X. Additionally or alternatively, the software component 310 can generate the code based at least in part on templates stored in a library 336. The library 336 can be maintained in the data store 306. For example, if the functional specification requires a defined set of equipment within a control strategy to add liquid to a tank, then the library can be queried for the associated code component 322, and within the code component 322 the code can be modified to meet the project requirements.

The code testing component 324 can test software code generated by the code component 322. The code testing component 324 can test the code to ensure it provides each function outlined within the functional specifications. The code testing component may not need to test every instance of code, because a given project may require multiple instances of the same code, also referred to as a class of code. For example, a functional specification may require the addition of several materials into a vessel, each material containing a similar configuration of equipment (e.g. pump, valve and flow meter). The software design specification component 320 and code component 322 will handle each instance of a flow meter in the same manner, resulting in similar software code or multiple instances of the same code. Consequently, the code testing component 324 may only be required to check a single instance of logic to ensure that the logic functions correctly, and only relationships to equipment tested for each instance. Moreover, the code testing component 324 can produce one or more testing specifications. The testing specifications detail a testing schema, and are related to and based at least in part on the functional specifications and software design specifications. The testing component 324 is aligned with the resource component 342, which states the quality goals and therefore the level of testing required, which may be based on industry or application. Additionally, for each test performed the code testing component 324 can subsequently generate one or more testing reports that detail the results of the tests. The testing reports including but not limited to errors, warnings, accuracy, possible solutions, expected results, actual results, electronic signatures, etc. In addition the testing component may contain emulation requirements, emulating the process in order to achieve the required test results.

The hardware component 312 includes a hardware design specification component 344, a bill of materials (B.O.M) component 326, and an installation component 328. The hardware component 312 can receive the functional specifications from the requirements component 308, and the software design specifications from the software component 310. The hardware design specification component 344 generates one or more hardware design specifications based on the functional specifications and/or software design specifications. The hardware design specifications are high-level representations of one or more hardware modules, and configurations of the modules, designed to execute the objectives of the functional specification and/or the software design specifications. For example, if the functional specifications and software design specifications require a flow meter, the hardware design specification component 344 can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, the hardware design specification component 344 can add one or more additional specification requirement layers, including but not limited to customer specific requirements, industry specific requirements, application specific requirements, and/or project specific requirements. For example, if the project is for an industry that requires explosion proof materials, then the design specification component 344 can add a corresponding industry specific requirements layer to the hardware design specifications. Similarly, if a customer requires the use of a particular brand, then an appropriate customer requirements layer can be added to the hardware design specification. The additional specification requirement layers can be maintained in the library 336, and the hardware design specification component 344 can query the library 336 to retrieve a desired specification requirement layer.

The hardware design specification component 344 communicates the hardware design specifications to the bill of materials component 326. The bill of materials component 326 can generate a bill of materials (B.O.M.) based on the hardware design specifications. The B.O.M. can include but is not limited to part names, quantities, part numbers, manufacturers, etc. The hardware design specifications and the B.O.M. can be communicated to the installation component 328. The installation component 328 can generate one or more installation specifications based on the hardware design specifications and the B.O.M. The installation specifications detail specifications of materials necessary to install the hardware modules, including but not limited to runs of wire, termination boxes, wiring specifications, conduit specifications, piping, definitions, etc.

The qualification component 304 includes a factory acceptance testing component 330, a site acceptance testing component 332, and a validation component 334. The qualification component 304 can communicate with the design component 302 including the requirements component 308, the software component 310, and the hardware component 312. The factory acceptance testing component 330 can qualify the design build prior to installation, including any prebuilt software or hardware modules. For example, the factory acceptance testing component 330 can test the I/O, communications, controls, and so forth of prebuilt software modules and control panels. In addition, the site acceptance testing component 332 can test software or hardware modules during or after the installation. For example, the site acceptance testing component 332 can test the I/O, communications, controls, and so forth once installation of the project is complete.

The validation component 334 is aligned with the resource component 342, and ensures the appropriate level of testing has occurred in order to validate the system. The validation component can ensure that each element of the software design and hardware design specifications operate as intended under the functional specifications. For example, the validation component may be particularly useful for life sciences based projects, where simply testing the design is insufficient, and validation of the test results is required. Additionally, the validation component 334 can obtain validation specifications from the data store 306. For instance, a validation specification containing a functional component, design component, code component, test component, and validation component may be retrieved to meet certain project requirements. The validation of this item may not need to be duplicated, thereby reducing the overall validation effort for a system.

Additionally, the requirements component 308 can include a cost component 340, and a resource component 342. The cost component 340 determines a cost amount (e.g. money, time, etc.) for a given project or set of projects. The cost component 340 can represent the cost amount as a maximum value, a minimum value, a target value (e.g. set point), a percentage value, a distribution, a state value (e.g. low, medium, or high), etc. The cost component 340 can determine the cost amount based on the user requirements and/or functional specification. Additionally or alternatively, the cost component 340 can infer the cost amount. The cost amount can be used by both the software component 310 and hardware component 312 in order to generate the software design and hardware design specifications, respectively. For example, the cost component 340 can determine that the maximum amount for a project is $10,000. The software design specification component 320, the hardware design specification component 344, and bill of materials component 326 will maintain an aggregate cost of less than or equal to the maximum amount of $10,000.

Similarly, the requirements component 308 can include a resource component 342. The resource component 342 determines a set of quality requirements based at least in part on the user requirements. The quality requirements can include a level of testing required (design qualification, installation qualification, operation qualification, process qualification), number of signatures required, training and experience of testers, protocol for handling testing errors, and so forth.

The system 300 further includes a user interface component 338. The user interface component 338 enables user interaction with at least one of: the user requirements component 308, the software component 310, the hardware component 312, or the qualification component 304. For example, the user interface component 338 can prompt a user to enter the user requirements via the inputs 314. Additionally, the user interface component 338 can enable modification of the functional specifications, software design specifications, hardware design specifications, bill of materials, computer code, installation specifications, and/or testing specifications. The user interface component can communicate with a user via any means known in the art, including but not limited to graphical user interfaces (GUI).

Figure 4:
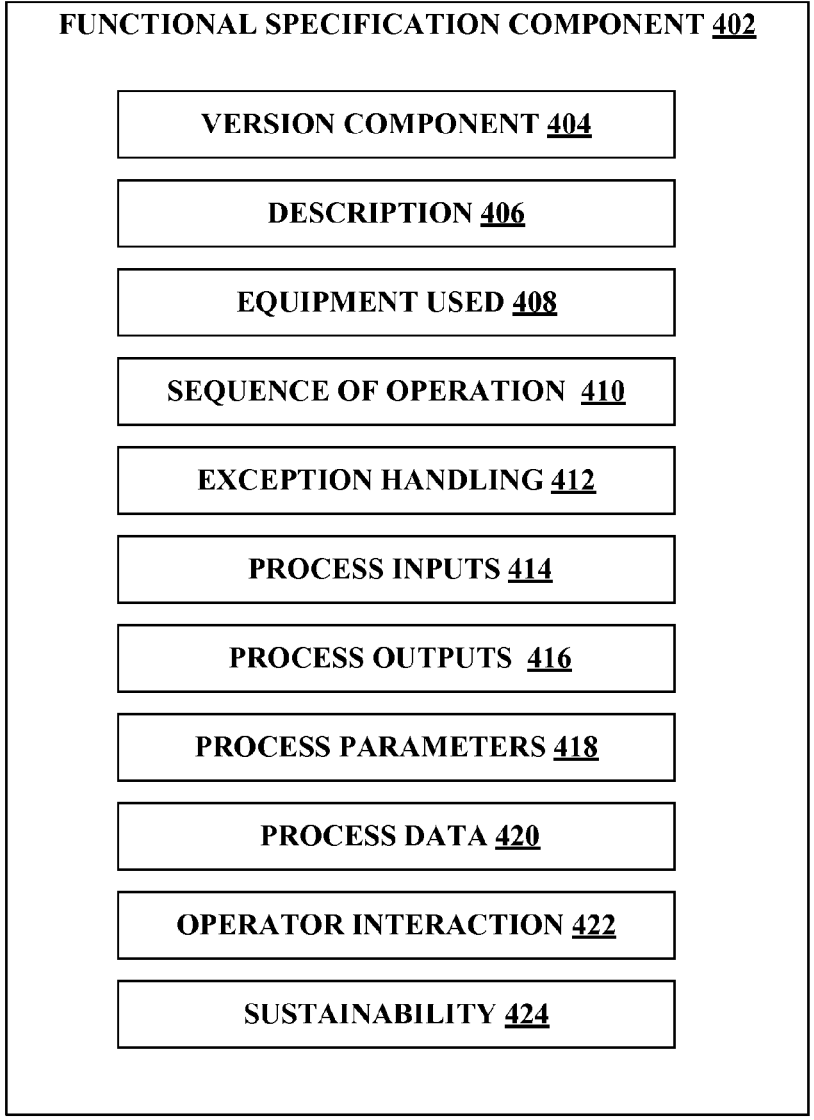
FIG. 4 is an exemplary application of a functional specification component in accordance with an aspect of the subject specification.

Turning now to FIG. 4, an exemplary application of a functional specification component 402 is shown in accordance with an aspect of the subject innovation. As noted supra, the functional specification is comprised of a series of functional specification components. A functional specification acquires one or more user requirements. For instance, the functional specification sub-components may be obtained from a data store (e.g. database) and/or user inputs. The functional specification component 402 which describe the function of the process includes a plurality of subcomponents, including a version component 404, a description component 406, an equipment used component 408, a sequence of operation component 410, an exception handling component 412, a process inputs component 414, a process outputs component 416, a process parameters component 418, a process data component 420, an operator interaction component 422, and a sustainability component 424. It is appreciated that other or additional functional specification sub-components may describe the function of certain technologies, and/or products within a system. These may be collected from a data store, and may be produced by vendors, customers, etc. . . . for common components.

The version component 404 can maintain data regarding modifications and/or updates to the functional specification component 402. The description component 406 can maintain a general description or overview of the functional specification component. The equipment used component 408 can determine the equipment required to execute the user requirements. For example, if the user requirements call for a liquid to be pumped at a rate X, then the equipment used component can determine that a liquid pump, flow meter, valves, and controls are required. The sequence of operation component 410 can determine the sequence of operations necessary to execute the functional component. For example, if the user requirements call for a liquid to be pumped at a rate X, the sequence of operations component can determine the system must receive a rate set point (e.g. X), open a flow valve, start the pump, and adjust the speed of the pump based on feedback from a flow meter. The exception handling component 412 determines the manner in which exceptions to the sequence of operations should be handled. For example, if a fault occurs the exception handling component 412 can determine to stop the pump. The process inputs component 414 and process outputs component 416 can determine the process inputs and outputs that are utilized such as lots of materials consumed, WIP lots produced, and so forth. The process parameters component 418 can determine the parameters of the process, such as tolerances, set points, etc. The process data component 420 can determine the data that needs to be generated as a result of the process, including but not limited to errors, set points, tolerances, lot numbers, date and time information, measurements, etc. The operator interaction component 422 can determine an operator interaction schema required to execute the process, including but not limited to displaying information, requiring input, etc.

The functional specification component 402 may also include a sustainability component 424. The sustainability component 424 can determine or infer the sustainability of material additions. The sustainability can be determined based on power required for a material addition, an end of life or life cycle expectation, water consumption, and so forth. Additionally or alternatively, the sustainability can be determined as discussed in the commonly owned U.S. patent application Ser. No. 10/970,502, herein incorporated by reference.

The subcomponents can determine, infer, and/or calculate based at least in part on the user requirements. Additionally, the subcomponents can also use industry specific requirements, customer specific requirements, application/site specific requirements, and/or project specific requirements. The functional specification component 402 generates a functional specification based on at least one subcomponent.

In view of the exemplary systems described supra, methodologies that may be implemented in accordance with the disclosed subject matter will be better appreciated with reference to the flow charts of FIGS. 4-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
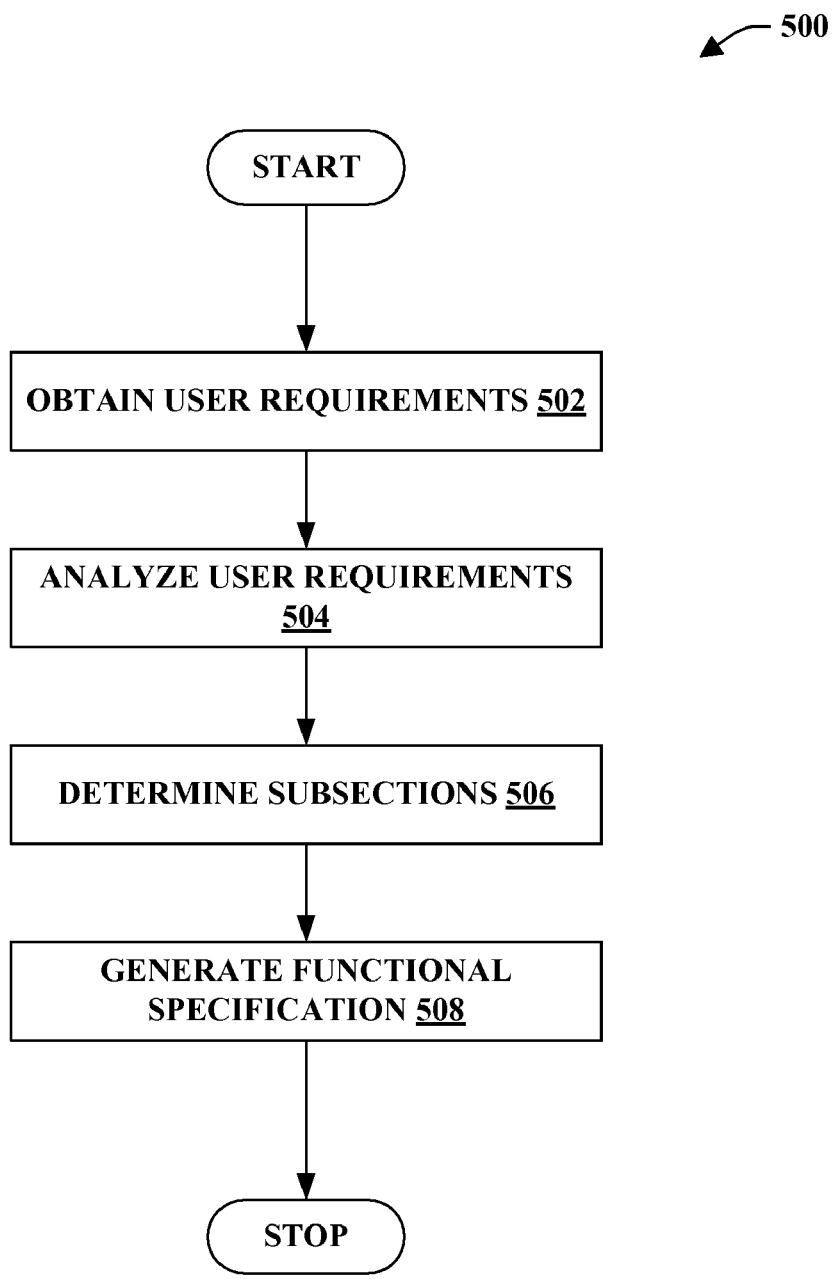
FIG. 5 is a flow chart illustrating a generalized methodology of generating a functional specification in accordance with the present specification.

FIG. 5 illustrates a methodology 500 that facilitates generating a functional specification. At 502, one or more user requirements can be obtained. The user requirements can be acquired from various sources, including explicit user inputs (e.g., configuration selections, question/answer) such as from mouse selections, keyboard selections, speech, and so forth. Additionally or alternatively, the user requirements can be acquired by querying a database, accessing a data store, or transmitted via a network communication system.

At 504, the user requirements can be analyzed. Typically, the user requirements include general information regarding the objectives and goals of an individual project or group of projects. For example, the set of user requirements can state that the goal of a particular project is to manufacture widgets. Additionally, the project requirements can include quality specifications such as the rate at which the widgets need to be manufactured, the size of the widgets, quality tolerances, etc.

At 506, one or more functional specification sub-sections can be determined based at least in part on the user requirements. The functional specifications detail a project's desired and/or required operation, and the subsections further define the project's operational objectives. The subsections can include but are not limited to a version subsection, a description subsection; equipment used subsection, a sequence of operation subsection, an exception handling subsection, a process inputs subsection, a process outputs subsection, a process parameters subsection, a process data subsection, an operator interaction subsection, and a sustainability subsection. At 508, a functional specification can be generated based on one more of the subsections.

Figure 6:
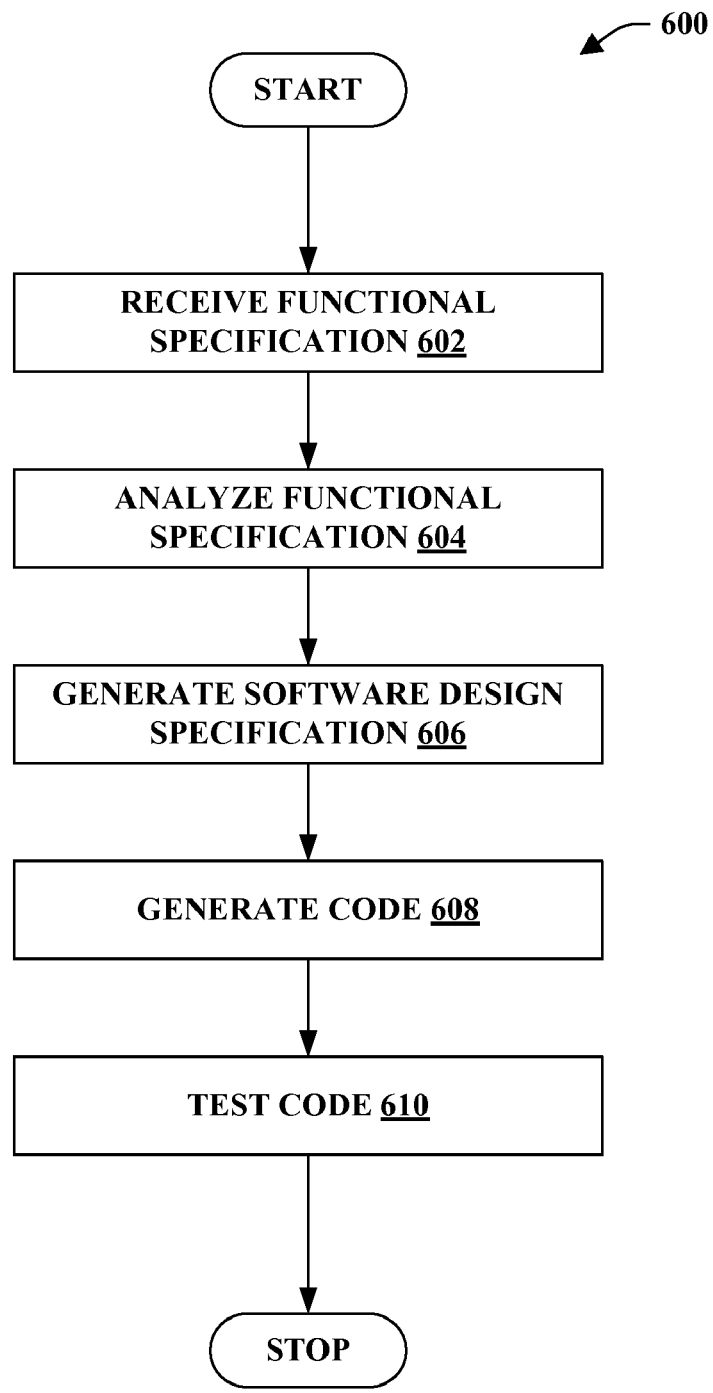
FIG. 6 is a flow chart illustrating a generalized methodology of generating a software design in accordance with the present specification.

FIG. 6 illustrates a methodology 600 that facilitates generating computer executable code in accordance with an aspect of the present innovation. At 602, one or more functional specifications can be acquired. At 604, the functional specifications can be analyzed. The functional specifications can include but are not limited to version information, a general description, a listing of the equipment used, a sequence of operations, exception handling procedures, a listing of process inputs and outputs, a listing of process parameters and data, an operator interaction schema, and sustainability data.

At 606, one or more software design specifications can be generated based at least in part on the functional specifications. The software design specifications illustrate the sequence of events and handling of exceptions, based on the functional specifications. The software design specifications are high-level (e.g. generic) representations illustrative of a sequence of events, and handling of exceptions, that can be translated into computer executable commands to implement the functional specifications. The software design specifications can be illustrated via flow charts, block diagrams, drawings (e.g. S88 batch-control-process-requirements), etc.

At 608, computer executable code is generated based at least in part on the software design specifications. For example, the software design specification may require a motor to be a run at a certain speed X, and the code is generated necessary to run the motor at speed X. Additionally or alternatively, the software code can be generated based at least in part on templates stored in a library. The library can be maintained in a data store. For example, if the functional specification requires a type Y motor to be run at speed X, then the library can be queried for a template directed towards running a type Y motor, and the template can be modified to operate the motor at speed X.

The computer executable code can be tested at 610. The code is tested to ensure it provides the correct functionality called for in the functional specifications. Every instance of the code does not necessarily have to be tested, because a given project may require multiple instances of the same code. For example, a functional specification may require a series of flow meters to perform an operation, and each instance of a flow meter will be coded in the same manner. Consequently, checking only a single instance of a flow meter may ensure that all the flow meter code portions are functioning correctly.

Figure 7:
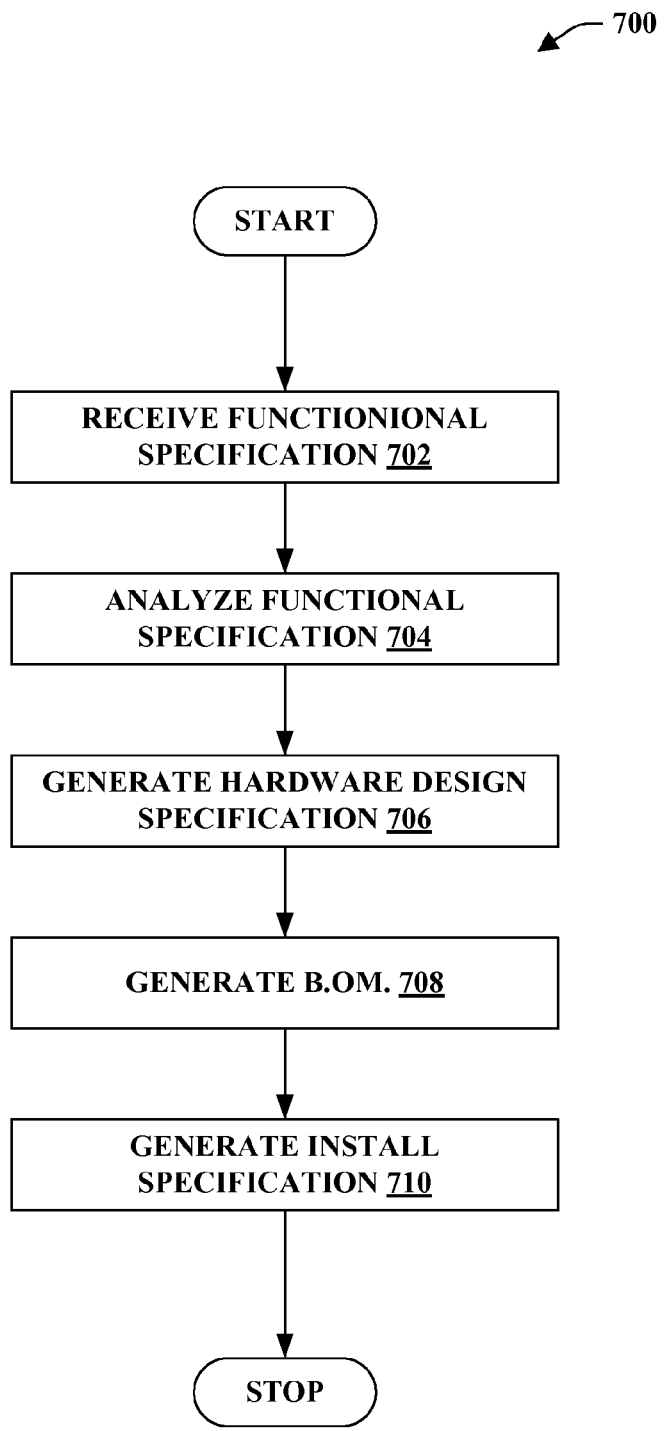
FIG. 7 is a flow chart illustrating a generalized methodology of generating a hardware design in accordance with the present specification.

FIG. 7 illustrates a methodology 700 that facilitates generating hardware specifications in accordance with an aspect of the present innovation. At 702, one or more functional specifications can be received or accessed. At 704, the functional specifications can be analyzed. The functional specifications can include but are not limited to version information, a general description, a listing of the equipment used, a sequence of operations, exception handling procedures, a listing of process inputs and outputs, a listing of process parameters and data, an operator interaction schema, and sustainability data.

At 706, one or more hardware design specifications can be generated based at least in part on the functional specifications. Additionally, the hardware design specification can be generated by adding additional specification requirements, including but not limited to customer specific requirements, industry specific requirements, application specific requirements, and/or project specific requirements. For example, a target industry may require explosion proof hardware, and an industry specific requirements layer can be added to the hardware design specifications that takes into account such limitations. Similarly, a customer may have brand or hardware type requirements, and a customer requirements layer can be added to the hardware design specification that includes the customer specific limitations. The hardware design specifications can be illustrated as drawings (e.g. electrical drawings, mechanical drawings, etc.), flowcharts, block diagrams, etc.

A bill of materials based on the hardware design specifications can be generated at 708. The bill of materials can include but is not limited to part names, quantities, part numbers, manufacturers, etc. Based on the hardware design specification and bill of materials one or more installation reports can be generated at 710. The installation reports can include but are not limited to runs or wire, termination boxes, wiring specifications, conduit specifications, piping, definitions, etc.

Figure 8:
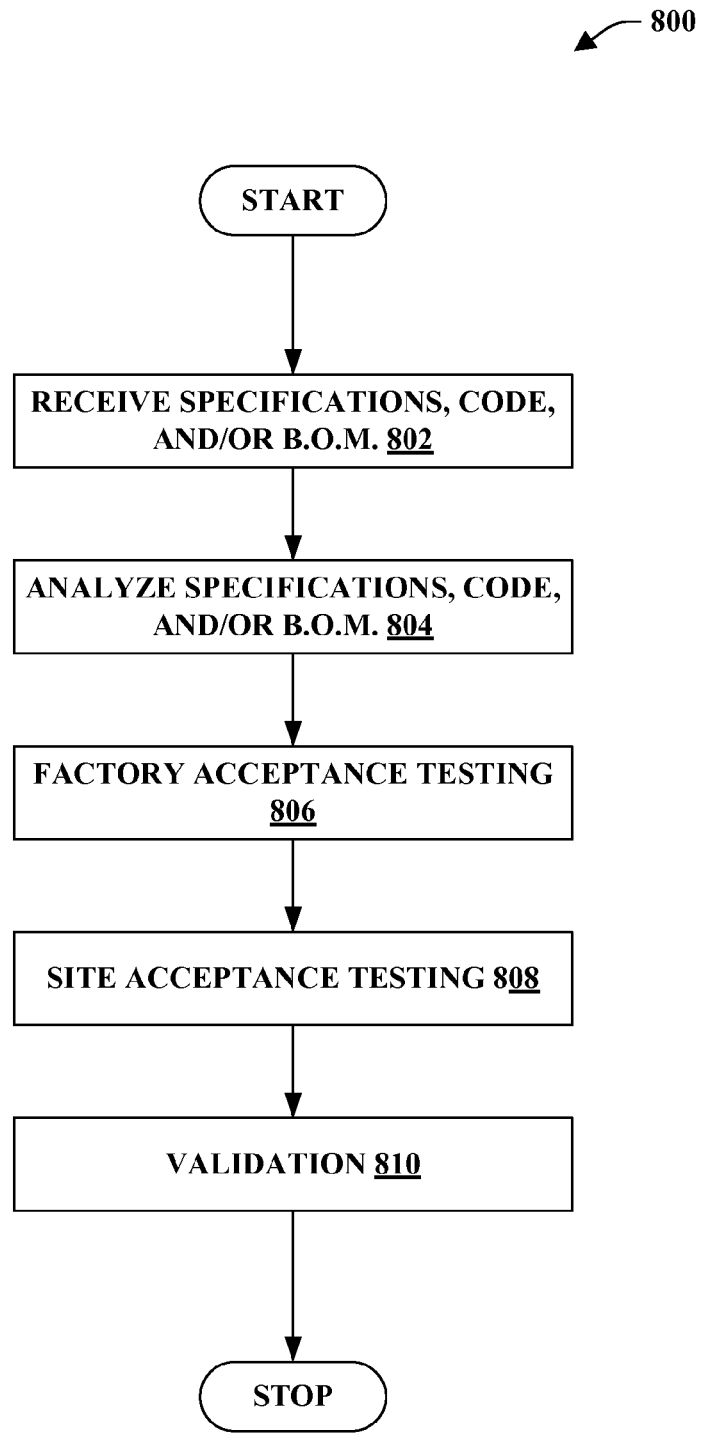
FIG. 8 is a flow chart illustrating a generalized methodology of implementing a qualification component in accordance with the present specification.

FIG. 8 illustrates a methodology 800 that facilitates testing the computer executable code and hardware in accordance with an aspect of the present innovation. At 802, one or more specifications, computer code executable codes, and/or bills of materials (B.O.M.) can be obtained. At 804, the specifications, computer code executable codes, and/or B.O.M. can be analyzed. The specifications can include functional specifications, software design specifications, and hardware design specifications. As noted supra, the functional specifications detail a project's desired and/or required operation. Additionally, the functional specifications can contain a plurality of subsections further defining the project's operational objectives, including but not limited to a version subsection, a description subsection, an equipment used subsection, a sequence of operation subsection, an exception handling subsection, a process inputs subsection, a process outputs subsection, a process parameters subsection, a process data subsection, an operator interaction subsection, and a sustainability subsection. Furthermore, the software design specifications illustrate the sequence of events, and handling of exceptions, based on the functional specifications. The hardware design specifications illustrate the design of the hardware generated to execute the software design and functional specifications.

Factory acceptance testing can be performed at 806. Factory acceptance testing qualifies the design build prior to installation, including prebuilt software or hardware modules. For example, the factory acceptance testing component can test a modules I/O, communications, controls, and so forth prior to shipment. In addition, the site acceptance testing examines the various aspects of the design build during or after the installation at 808.

At 810, test results can be validated to ensure that each element of the software design specification and hardware design specification operate as intended, and are in concert with the functional specifications. For example, validation may be particularly useful for life sciences based projects, wherein simply testing the design is insufficient, and validation of the test results and correct operation are required.

Figure 9:
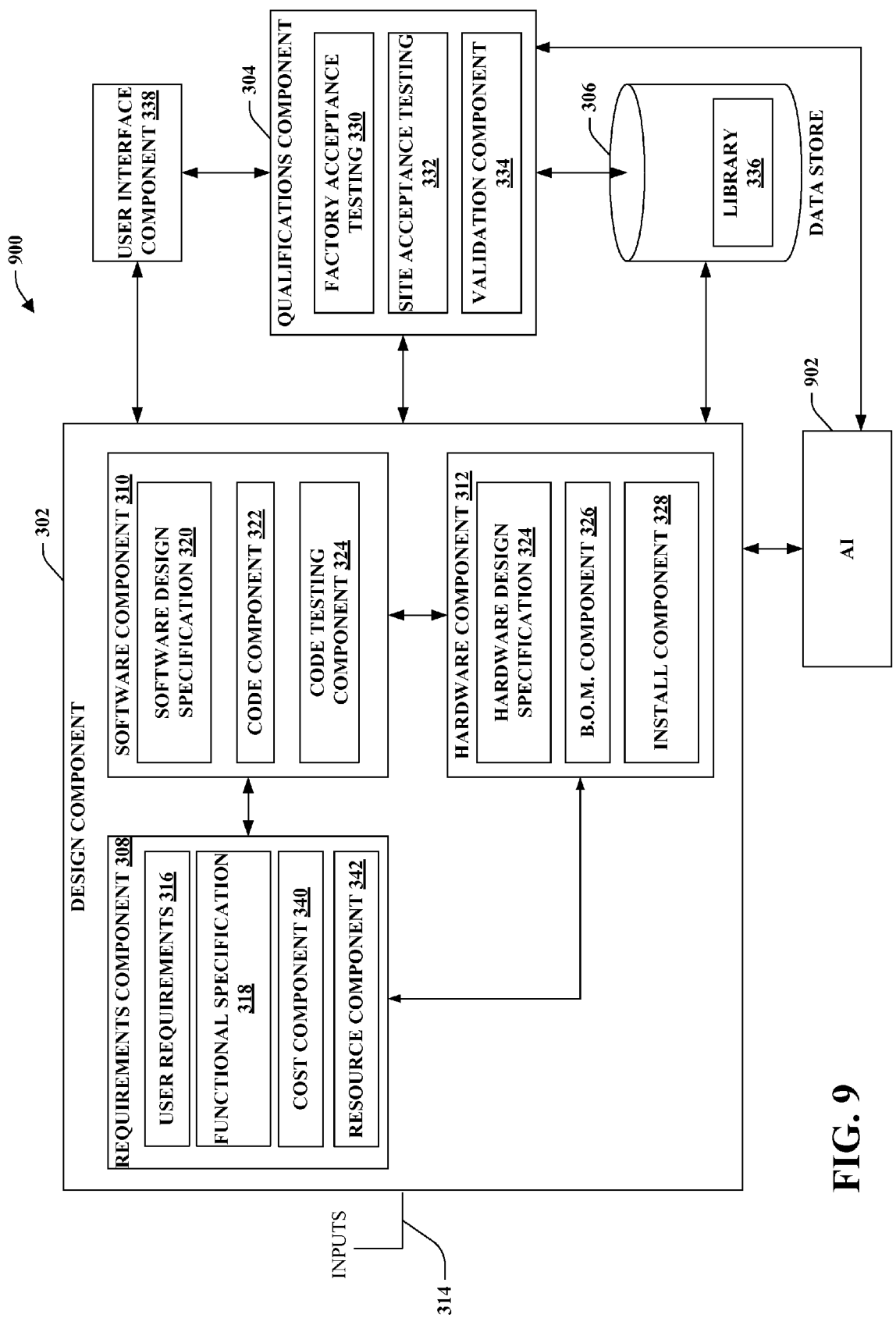
FIG. 9 illustrates a system that employs an artificial intelligence component which facilitates automating one or more features in accordance with the subject specification.

FIG. 9 illustrates a system 900 that employs an artificial intelligence (AI) component 902 which facilitates automating one or more features in accordance with the subject innovation. The subject innovation (e.g., in connection with inferring) can employ various AI-based schemes for carrying out various aspects thereof. For example, a process for converting the functional specifications into computer executable commands can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 10:
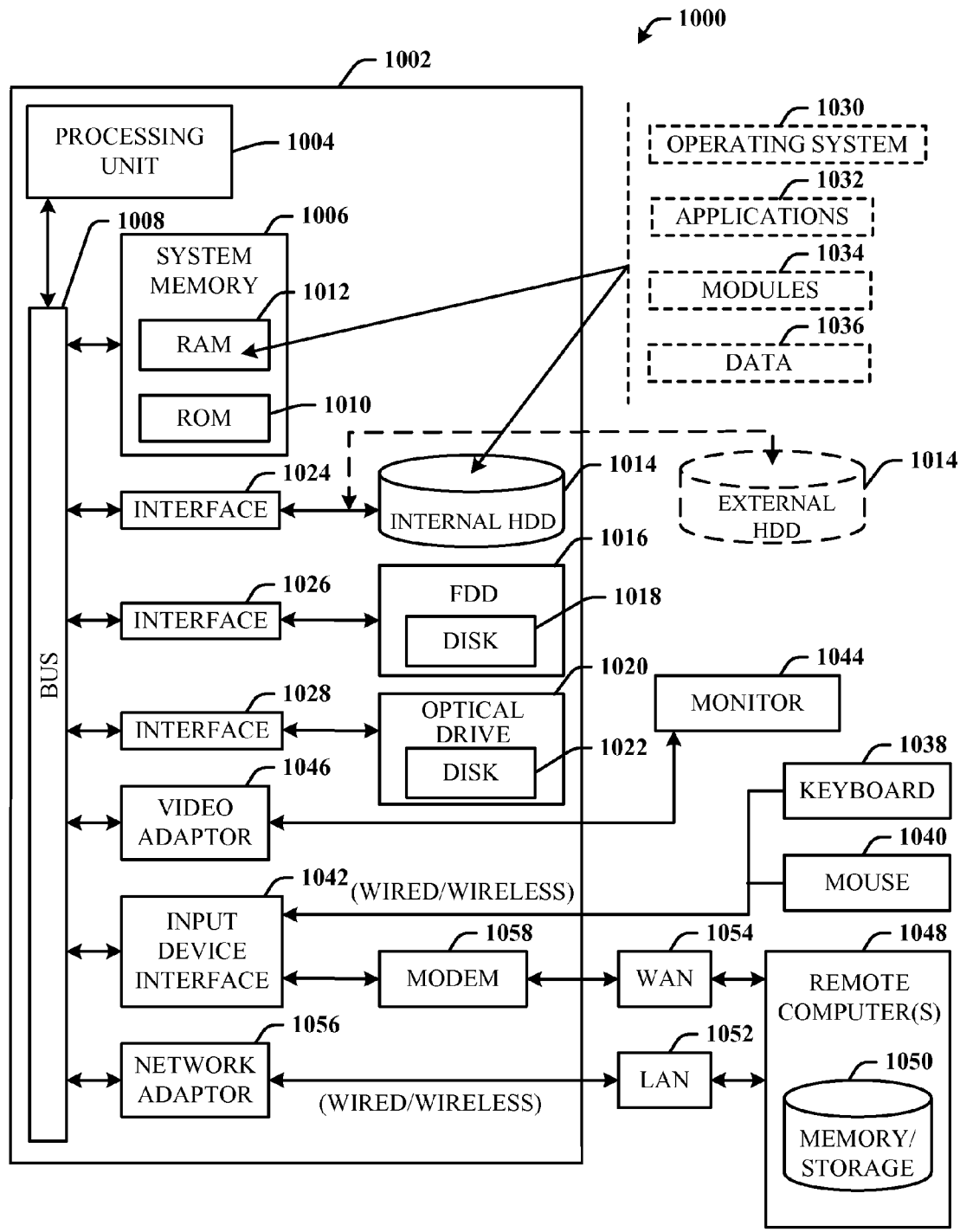
FIG. 10 is a schematic block diagram illustrating a suitable operating environment in accordance with an aspect of the subject specification.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, there is illustrated an exemplary environment 1000 for implementing various aspects of the innovation that includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
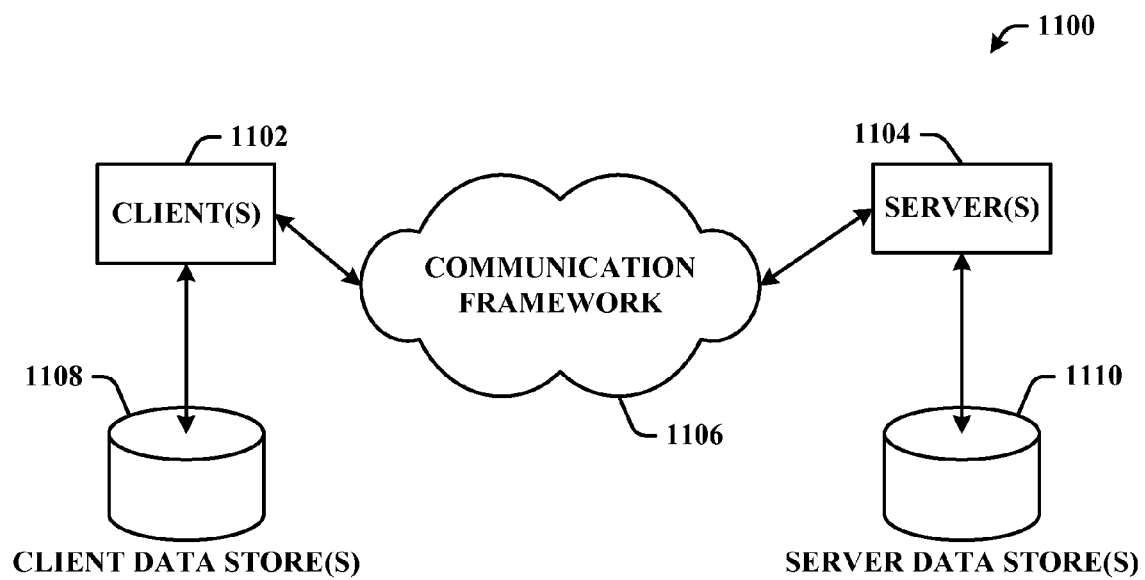
FIG. 11 is a schematic block diagram of a sample-computing environment in accordance with which the subject specification.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating information solutions, comprising:
    at least one processor;
    a memory communicatively coupled to the at least one processor, the memory having stored therein computer-executable instructions configured to implement the system, including:
        a requirements component configured to generate at least one functional specification for an automation project based on one or more specified project requirements;
        a software component configured to receive the at least one functional specification and to generate, based at least in part on the at least one functional specification, a software design specification defining at least a sequence of events and at least one exception handling definition for implementing the automation project;
        a hardware component configured to receive the at least one functional specification and to generate, based at least in part on the at least one functional specification, a hardware design specification specifying at least one hardware module for implementing the automation project; and
        a qualification component configured to verify cohesive operation of the software design specification and the hardware design specification.

2. The system of claim 1, wherein the requirements component includes a user requirements component configured to obtain at least one of the one or more specified project requirements.

3. The system of claim 1, wherein the software component includes a code component configured to generate at least one software module comprising computer-executable commands for carrying out at least a portion of the automation project based at least in part on the software design specification.

4. The system of claim 3, wherein the code component is configured to map at least one functional representation defined by the software design specification to at least one generic template stored in a library and to modify the at least one generic template in accordance with the at least one functional representation to yield the at least one software module.

5. The system of claim 3, wherein the software component includes a code testing component configured to test functionality of the computer-executable commands.

6. The system of claim 3, wherein the qualification component includes a factory acceptance testing component configured to test at least one of the at least one hardware module or the at least one software module.

7. The system of claim 3, wherein the qualification component includes a site acceptance testing component configured to test at least one of the at least one hardware module or the at least one software module, wherein testing occurs at least one of during or after installation of the automation project.

8. The system of claim 3, wherein the qualification component includes a validation component configured to validate test results generated for at least one of the at least one hardware module or the at least one software module.

9. The system of claim 1, wherein the hardware component includes a bill of materials component configured to generate at least one bill of materials listing at least subset of hardware required to implement the automation project based at least in part on the hardware design specification.

10. The system of claim 1, wherein the requirements component includes a cost component configured to determine a cost amount for the automation project based at least in part on the one or more specified project requirements.

11. The system of claim 10, wherein at least one of the functional specification, the software design specification, or the hardware design specification is based at least in part on the cost amount.

12. The system of claim 1, wherein the requirements component includes a quality component configured to determine at least one quality goal based at least in part on the one or more specified project requirements.

13. The system of claim 12, wherein at least one of the functional specification, the software design specification, or the hardware design specification is based at least in part on the at least one quality goal.

14. The system of claim 1, wherein at least one of the software component or the hardware component is configured to generate the software design specification or the hardware design specification to conform to at least one of an industry specific definition, a customer specific definition, an application specific definition, or a project specific definition.

15. The system of claim 1, wherein the qualification component is configured to determine a level of testing commensurate with at least one of an industry standard or an application standard and to generate at least one test specification detailing a testing schema for testing operation of at least one of the at least one hardware module or the at least one software module in accordance with the level of testing.

16. The system of claim 1, wherein the hardware component is configured to generate the hardware design specification based at least in part on the software design specification.

17. The system of claim 1, wherein the functional specification includes at least one of a version, a description, an equipment used listing, a sequence of operations, an exception handling protocol, one or more process inputs, one or more process outputs, one or more process parameters, process data, an operator interaction schema, or sustainability data.

18. The system of claim 1, further comprising a user interface component configured to expose at least one interface that enables user interaction with at least one of the requirements component, the software component, the hardware component, or the qualification component.

19. A method facilitating industrial automation design, comprising:
employing a processor executing computer-executable instructions stored on a non-transitory computer-readable medium to implement the following acts:
analyzing at least one specified requirement including information identifying one or more objectives of an industrial project;
generating a functional specification for the industrial project based at least in part on the at least one user requirement;
generating a software design specification illustrating a sequence of events and at least one exception handling routine for implementing the industrial project based at least in part on the functional specification;
generating a hardware design specification specifying at least one hardware module for implementing the industrial project based at least in part on the functional specification; and
testing functionality of at least one of the software design specification or the hardware design specification for correct operation, wherein correct operation is determined at least in part by the functional specification.

20. The method of claim 19, further comprising converting the functional specification into computer-executable commands to yield at least one software module.

21. The method of claim 20, further comprising:
mapping at least one functional representation defined by the software design specification to at least one generic software template; and
modifying the at least one software template in accordance with the at least one functional representation to yield the at least one software module.

22. The method of claim 21, further comprising:
determining a set of quality requirements based at least in part on the at least one specified requirement;
determining a required level of testing based on the set of quality requirements; and
testing functionality of the at least one hardware module and the at least one software module in accordance with the required level of testing.

23. The method of claim 20, further comprising generating at least one test specification detailing a testing schema for testing operation of at least one of the at least one hardware module or the at least one software module.

24. The method of claim 20, further comprising conducting factory acceptance testing on at least one of the at least one hardware module or the at least one software module.

25. The method of claim 20, further comprising conducting site acceptance testing on the at least one hardware module and the at least one software module at least one of during installation of the industrial project or after installation of the industrial project.

26. The method of claim 20, further comprising validating test results generated for at the least one hardware module or the at least one software module.

27. The method of claim 19, further comprising generating a bill of materials listing hardware required to implement the industrial project based at least in part on the hardware design specification.

28. The method of claim 19, further comprising determining a cost amount for the industrial project based at least in part on the at least one specified requirement.

29. The method of claim 28, further comprising generating at least one of the functional specification, the software design specification, or the hardware design specification as a function of the cost amount.

30. The method of claim 19, further comprising determining at least one quality goal based at least in part on the at least one specified requirements.

31. The method of claim 30, further comprising generating at least one of the functional specification, the software design specification, or the hardware design specification as a function of the at least one quality goal.

32. The method of claim 19, further comprising generating at least one of the software design specification or the hardware design specification to conform to at least one of an industry-specific definition, a customer-specific definition, an application-specific definition, a site specific definition, or a project-specific definition.

33. The method of claim 19, further comprising generating the hardware design specification based at least in part on the software design specification.

34. The method of claim 19, further comprising determining the functional specification based at least in part on at least one of a version, a description, an equipment used listing, a sequence of operations, an exception handling protocol, one or more process inputs, one or more process outputs, one or more process parameters, process data, an operator interaction schema, or sustainability data.

35. The method of claim 19, further comprising enabling modification of at least one of the functional specification, the software design specification, computer code, the hardware design specification, a bill of materials, or an installation specification via a user interface.

36. A non-transitory computer-readable medium having stored thereon computer-executable instructions that, in response to execution by a computer, direct the computer to:
determine one or more project requirements for an automation project;
generate at least one functional specification for the automation project based at least in part on the one or more project requirements;
generate a software design specification defining at least a sequence of events and at least one exception handling definition based at least in part on the at least one functional specification;
generate at least one software module comprising computer-executable commands based on the software design specification;
generate a hardware design specification identifying at least one hardware module for implementing the automation project based at least in part on the functional specification; and test at least one of the software design specification, the hardware design specification, or the computer-executable commands for correct operation under the at least one functional specification.

37. The non-transitory computer-readable medium of claim 36, wherein the computer-executable instructions further direct the computer to select and modify at least one software template based on the software design specification.

38. The non-transitory computer-readable medium of claim 36, wherein the computer-executable instructions further direct the computer to enable manual modification of at least one of the functional specification, the software design specification, computer code, the hardware design specification, a bill of materials, or an installation specification using a user interface.

39. The non-transitory computer-readable medium of claim 36, wherein the computer-executable instructions further direct the computer to generate a bill of materials listing hardware required to implement the automation project based at least in part on the hardware design specification.

40. A non-transitory computer-readable medium having stored thereon computer-implemented components for facilitating industrial automation design, the computer-implemented components comprising:

a requirements component that generates at least one functional specification based on one or more received requirements defining a set of objectives for an industrial project, the requirements component including a user requirements component that obtains at least one of the one or more received requirements;

a software component that creates, based at least in part on the at least one functional specification, a software design specification illustrating a sequence of events and at least one exception handling routine for implementing the industrial project;

a hardware component that creates, based at least in part on the at least one functional specification, a hardware design specification specifying at least one hardware module for implementing the industrial project; and a qualification component that ensures cohesive operation of the software design specification and the hardware design specification.

* * * * *